United States Patent
Singh et al.

(10) Patent No.: US 8,594,087 B2
(45) Date of Patent: Nov. 26, 2013

(54) ENCODING-BASED MULTICAST PACKET DUPLICATION CONTROL SUITABLE FOR VLAN SYSTEMS

(75) Inventors: Gaurav Singh, Santa Clara, CA (US); Govind Malalur, Fremont, CA (US); Brian Hang Wai Yang, Monterey Park, CA (US)

(73) Assignee: Netlogic Microsystems, Inc., Irvine, CA (US)

(*) Notice: Subject to any disclaimer, the term of this patent is extended or adjusted under 35 U.S.C. 154(b) by 1015 days.

(21) Appl. No.: 10/687,784

(22) Filed: Oct. 17, 2003

(65) Prior Publication Data
US 2005/0083839 A1  Apr. 21, 2005

(51) Int. Cl.
*H04L 12/28* (2006.01)

(52) U.S. Cl.
USPC .......................................................... 370/390

(58) Field of Classification Search
USPC ......... 370/230, 235, 390, 392, 429, 432, 335, 370/360, 389
See application file for complete search history.

(56) References Cited

U.S. PATENT DOCUMENTS

| | | | | |
|---|---|---|---|---|
| 5,684,800 A * | 11/1997 | Dobbins et al. | ............... | 370/401 |
| 5,929,792 A * | 7/1999 | Herriot | ............................ | 341/55 |
| 6,553,028 B1 * | 4/2003 | Tang et al. | ..................... | 370/389 |
| 6,614,787 B1 * | 9/2003 | Jain et al. | ....................... | 370/390 |
| 6,775,283 B1 * | 8/2004 | Williams | ........................ | 370/392 |
| 6,963,566 B1 * | 11/2005 | Kaniz et al. | ..................... | 370/392 |
| 7,397,809 B2 * | 7/2008 | Wang | ............................. | 370/417 |
| 2002/0110139 A1 * | 8/2002 | Boura et al. | ................... | 370/432 |
| 2004/0264464 A1 * | 12/2004 | Wong | ............................. | 370/390 |
| 2005/0080869 A1 * | 4/2005 | Bender et al. | ................... | 709/212 |
| 2005/0083839 A1 * | 4/2005 | Singh et al. | ..................... | 370/230 |
| 2005/0157741 A1 * | 7/2005 | Wu et al. | ...................... | 370/432 |

* cited by examiner

*Primary Examiner* — Andrew Lai
*Assistant Examiner* — Leon Andrews
(74) *Attorney, Agent, or Firm* — Sterne, Kessler, Goldstein & Fox P.L.L.C.

(57) ABSTRACT

A packet duplication control system including an input port for receiving a packet and a plurality of output ports for outputting duplications of the packet is disclosed. The duplications can be suitable to support a Virtual Local Area Network (VLAN) system. The duplications can be controlled by descriptors arranged in a linked-list table. Also, the descriptors can have encoding formats, such as contiguous range encoding, non-contiguous range encoding, and discrete encoding. Further, the linked-list table can include at least one shared descriptor.

20 Claims, 5 Drawing Sheets

FIG. 1 (conventional)

ENCODING-BASED MULTICAST PACKET DUPLICATION CONTROL SUITABLE FOR VLAN SYSTEMS

FIELD

The invention relates generally to the field of networking, and more particularly to packet duplication control.

BACKGROUND

In networking systems, routers and/or switches typically move packets of information from one of a number of input ports to one or more output ports. In many applications, such as multicasting, a packet may need to be duplicated on multiple output ports. Further, for support of Virtual Local Area Network (VLAN or "Vlan") systems, a packet may need to be duplicated according to a wide variety of possibilities. In a typical Vlan system, 12-bits may be used to indicate a particular Vlan, so the number of possible distinct Vlans that need to be supported in the system can be as high as 4096. These requirements pose a challenge to architect the multicast packet duplication logic for Vlan systems where up to about 4K distinct Vlans can be supported per port while also maintaining the minimum duplication requirements.

Figure 1:
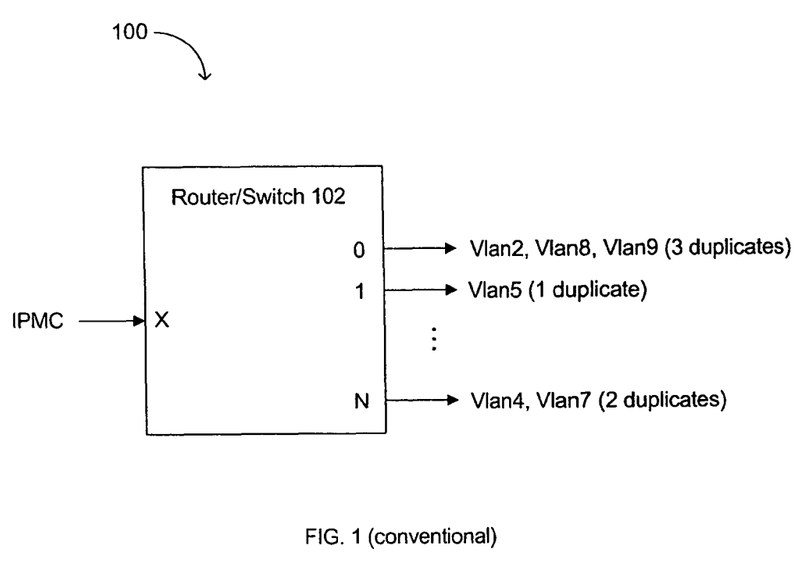
FIG. 1 a block diagram of a conventional router/switch port arrangement used for packet duplication for Vlan systems.

A block diagram of a conventional router/switch port arrangement used for packet duplication for Vlan systems is shown in FIG. 1 and indicated by the general reference character 100. In FIG. 1, an Internet Protocol MultCast (IPMC) type packet is received by Router/Switch 102 at input port or interface X. The output ports or interfaces include port 0 requiring 3 duplicates of the packet, which are designated for Vlan2, Vlan8, and Vlan9. Output port 1 in this example only requires one duplicate for Vlan5. Output port N requires 2 duplicates: one for Vlan4 and one for Vlan7. The duplication possibilities could range from 2K times on one interface, 3K on another, 3K on another, or just one on each, for example. Further, each copy of the multicast packet can be sent to a different Vlan on a different port or multiple copies might need to be sent on each port. Accordingly, a hardware solution must be flexible enough to accommodate IPMC or other similar type packets requiring duplication on a variety of designated member ports.

Such a wide disparity of options is typically implemented in conventional approaches by simply expanding the memory used to cover all the possible cases, with little flexibility. However, such an inefficient use of memory is not desirable due to cost factors.

Consequently, what is needed is a solution that can control packet duplication in a flexible and memory efficient manner.

SUMMARY

The invention provides a structure and method for controlling packet duplication in a flexible and memory efficient manner.

According to embodiments of the invention, a packet duplication system includes an input port for receiving a packet and a plurality of output ports for outputting duplications of the packet. The duplications can be suitable to support a Virtual Local Area Network (VLAN) system. The duplications can be controlled by descriptors arranged in a linked-list table. Also, the descriptors can have encoding formats, such as contiguous range encoding, non-contiguous range encoding, and discrete encoding. Further, the linked-list table can include at least one shared descriptor.

According to another aspect of the invention, a method of controlling a duplication of a packet includes receiving the packet, accessing a first pointer, accessing a second pointer, accessing a descriptor in response to the second pointer, and applying an encoding format for the duplication of the packet. The encoding format can include contiguous range encoding, non-contiguous range encoding, and/or discrete encoding. Further, the method can include the use of a hashing type function. The method can also be suitable to support a Virtual Local Area Network (VLAN) system.

The invention can provide a fully configurable and flexible duplication scheme. This approach allows for efficient use of on-chip memory for systems requiring a wide range of duplication options over multiple ports.

BRIEF DESCRIPTION OF THE FIGURES

Embodiments of the invention are described with reference to the FIGS, in which.

DETAILED DESCRIPTION

Embodiments of the invention are described with reference to specific diagrams depicting system arrangements and methods. Those skilled in the art will recognize that the description is for illustration and to provide the best mode of practicing the invention. The description is not meant to be limiting. For example, reference is made to several types of packets and application systems, such as Virtual Local Area Network (VLAN or "Vlan") systems, but the invention is applicable to other types of packets and/or systems as well. Further, pointer and/or descriptor table organization, including separate tables and the like, merely provide example implementations and should not be construed as limiting.

Figure 2:
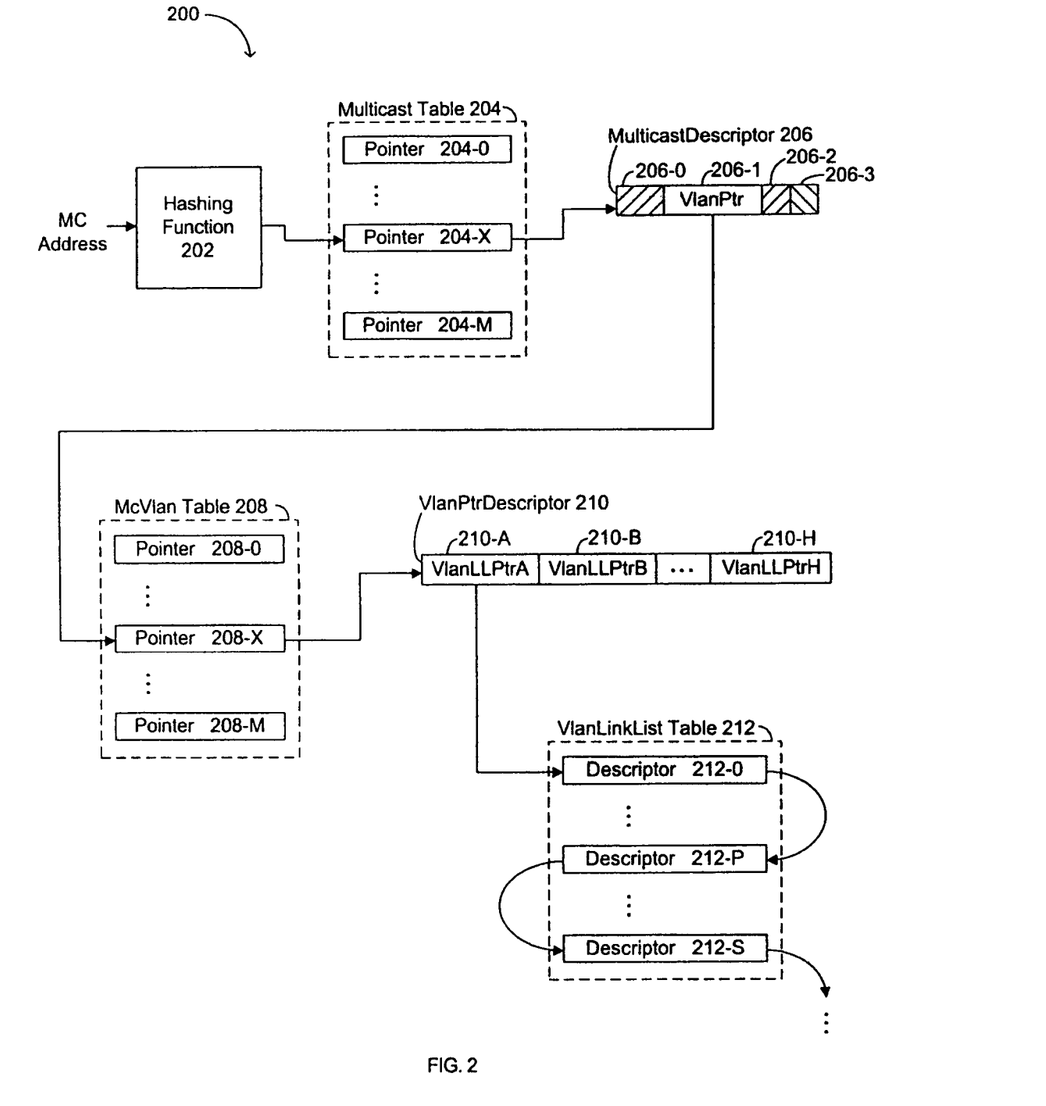
FIG. 2 is a block diagram of a multicast forwarding system according to an embodiment.

Referring now to FIG. 2, a block diagram of a multicast forwarding system according to an embodiment is shown and indicated by the general reference character 200. A MultiCast (MC)Address can be received and passed through Hashing Function 202 to index Multicast Table 204. Multicast Table 204 can include a plurality of pointers, such as shown Pointer 204-0, Pointer 204-X, and Pointer 204-M. For example, the result of Hashing Function 202 can select Pointer 204-X including MulticastDescriptor 206. MulticastDescriptor 206 can include several fields, such as field 206-0, which may be a Time-To-Live (TTL) type field, VlanPtr 206-1, field 206-2, and field 206-3. VlanPtr 206-1 can, for example, select Pointer 208-X of McVlan (Multicast Vlan) Table 208. McVlan Table 208 can include multiple pointers, such as ranging from Pointer 208-0 through 208-M. Each of the pointers in McVlan Table 208 can have a width of entries where each entry corresponds to an output (i.e., exit) port of the system. This can allow the packet duplication for Vlans to essentially be done on a per-port basis. Pointer 208-X can include VlanPtrDescriptor 210, which can include several linked-list pointers corresponding to system output ports, such as VlanLLPtrA 210-A and VlanLLPtrB 210-B through VlanLLPtrH 210-H. In this example, VlanLLPtrA can select Descriptor 212-0 from VlanLinkList Table 212. Descriptor 212-0 can include a link to Descriptor 212-P, which can include a link to Descriptor 212-S, and the chain can continue if necessary. In this example case, there are 8 ports of exit, each corresponding to one of the pointers chosen from VlanLLPtrA through VlanLLPtrH. Accordingly, VlanLLPtrA can be an index into the VlanLinkList Table 212 for Port "A," VlanLLPtrB can be an index for Port "B," and so on.

Figure 3:
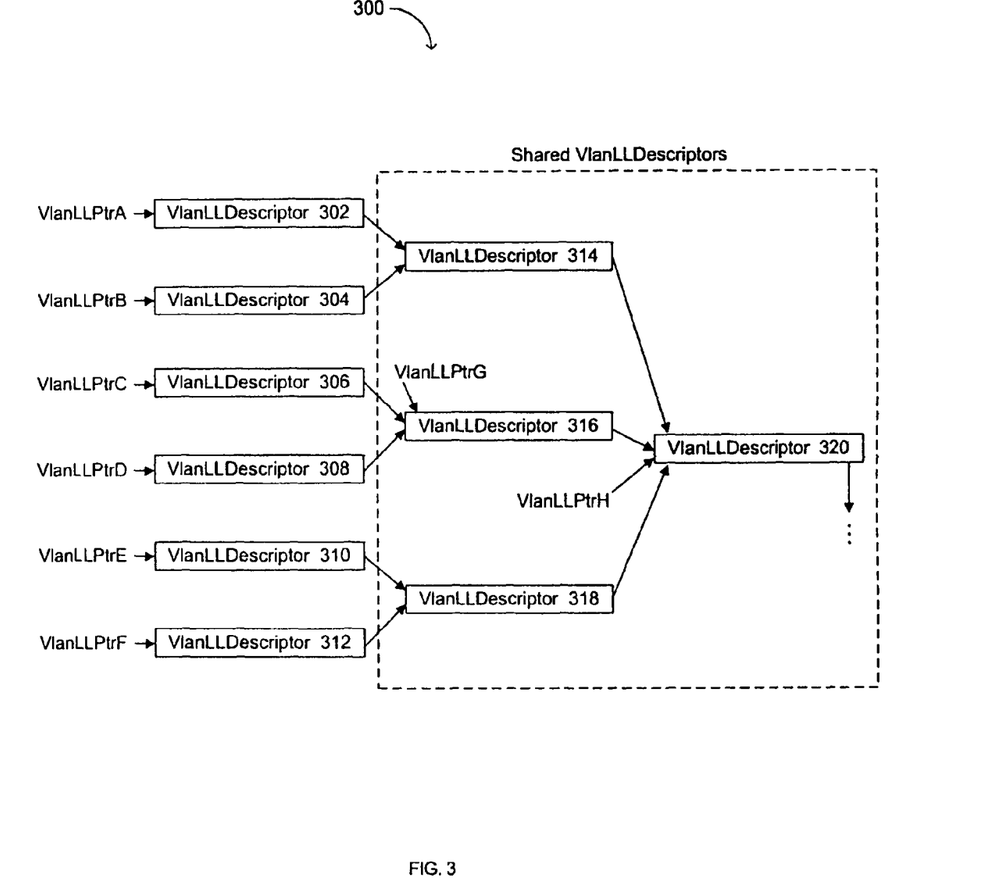
FIG. 3 is a block diagram of a multicast Vlan linked-list structure according to an embodiment.

Referring now to FIG. 3, a block diagram of a multicast Vlan linked-list structure according to an embodiment is shown and indicated by the general reference character 300. This structure is only one example of the many possible link structures available according to embodiments of the linked-list table discussed above with reference to FIG. 2. In FIG. 3, VlanLLPtrA may point to VlanLLDescriptor 302, VlanLLPtrB may point to VlanLLDescriptor 304, VlanLLPtrC may point to VlanLLDescriptor 306, VlanLLPtrD may point to VlanLLDescriptor 308, VlanLLPtrE may point to VlanLLDescriptor 310, and VlanLLPtrF may point to VlanLLDescriptor 312. In addition, the structure allows for sharing descriptors, such as those shown in the SharedVlanLLDescriptors dashed box. VlanDescriptor 314 can be linked by VlanLLDescriptor 302 and VlanLLDescriptor 304 and it can point to VlanLLDescriptor 320. VlanLLDescriptor 316 can be linked by VlanLLDescriptor 306, VlanLLDescriptor 308, and VlanLLPtrG. Further, VlanLLDescriptor 316 can point to VlanLLDescriptor 320. VlanLLDescriptor 318 can be linked by VlanLLDescriptor 310 and VlanLLDescriptor 312 and it can point to VlanLLDescriptor 320. Further, VlanLLPtrH can also point to VlanLLDescriptor 320. As indicated, this illustration shows merely one possible linking structure, but any suitable structure can be formed using the flexible linking options according to embodiments. Further, a system design can be optimized so that the available storage space is allocated for a typical case while still providing support for up to 4K distinct Vlans on each port. The sharing of multiple linked-lists, in particular, can significantly increase the efficiency of use of the available storage and/or table space.

Next, a few example encoding formats will be described. Such formats can allow for optimized use of the available table space depending on the particular distribution of the Vlans in the system. Of course, other possible encoding formats can also be used according to embodiments.

Figure 4A:
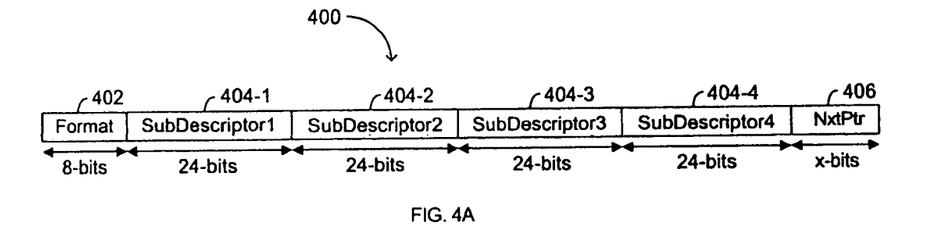
FIG. 4A is a diagram of a multicast Vlan linked-list descriptor structure according to an embodiment.

Referring now to FIG. 4A, a diagram of a multicast Vlan linked-list descriptor structure according to an embodiment is shown and indicated by the general reference character 400. The descriptor describes the Vlans that a packet is to be multicast on and several possible formats can be used. One example format is shown in FIG. 4A and it includes Format 402, which can be 8-bits or less, SubDescriptor1 404-1, SubDescriptor2 404-2, SubDescriptor3 404-3, SubDescriptor4 404-4, and NxtPtr 406. Format 402 can include control bits for use in selecting a format for each of the sub-descriptors in that descriptor, for example. Also, each of the sub-descriptors can be 24-bits wide, as one example. Further, while four sub-descriptors are shown per descriptor, more or less than four sub-descriptors can be employed, depending on the optimal system and/or memory arrangement. Further, sub-descriptors can be linked together, as discussed above with reference to FIGS. 2 and 3, to form larger linked structures. The number of bits available for the NxtPtr field depends on system design considerations, such as the size of the linked-list memory allocated and the number of sub-descriptors chosen per descriptor.

Figure 4B:
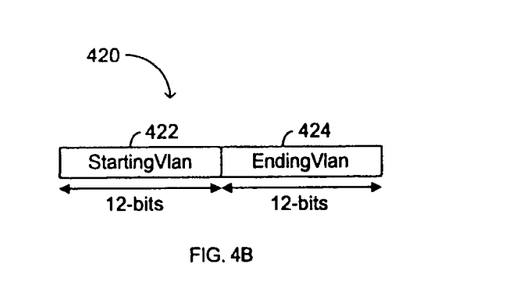
FIG. 4B is a diagram of a contiguous Vlan range sub-descriptor encoding scheme structure according to an embodiment.

Referring now to FIG. 4B, a diagram of a contiguous Vlan range sub-descriptor encoding scheme structure according to an embodiment is shown and indicated by the general reference character 420. In this format, StartingVlan 422 can use 12-bits to indicate the beginning of the contiguous range and EndingVlan 424 can use the remaining 12-bits to indicate the end of the contiguous range. Accordingly, an associated packet can be duplicated on all the Vlans designated in the range.

Figure 4C:
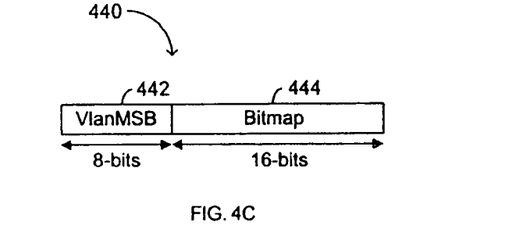
FIG. 4C is a diagram of a non-contiguous Vlan range sub-descriptor encoding scheme structure according to an embodiment.

Referring now to FIG. 4C, a diagram of a non-contiguous Vlan range sub-descriptors encoding scheme structure according to an embodiment is shown and indicated by the general reference character 440. In this format, VlanMSB 442 can use 8-bits to indicate a most significant bit portion and Bitmap 444 can indicate a pattern using the least significant bits. The Vlan range can include Vlans that share the same 8-bits of MSB but with different 4-bit LSB portions. The lower 4-bits of the LSB for each Vlan in this range can be decoded into a 16-bit vector. The 16-bit vectors derived from the lower 4-bits of all the Vlans in the range may be logically OR-ed to generate the final 16-bit-bitmap value. Each bit of this bitmap can correspond to a Vlan for which a packet should be duplicated. Accordingly, an associated packet can be duplicated on all the Vlans as designated in the range.

Figure 4D:
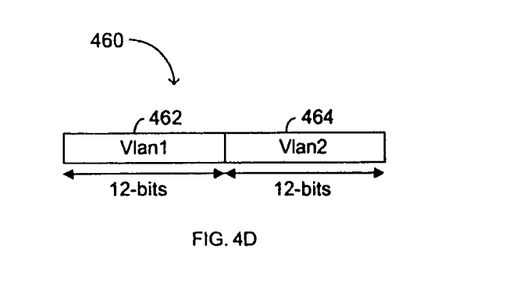
FIG. 4D is a diagram of a discrete Vlan encoding scheme structure according to an embodiment.

Referring now to FIG. 4D, a diagram of a discrete Vlan encoding scheme structure according to an embodiment is shown and indicated by the general reference character 460. In this format, Vlan1 462 can use 12-bits to indicate a first Vlan and Vlan2 464 can use the remaining 12-bits to indicate a second Vlan. Accordingly, an associated packet can be duplicated on the designated Vlans.

Figure 5:
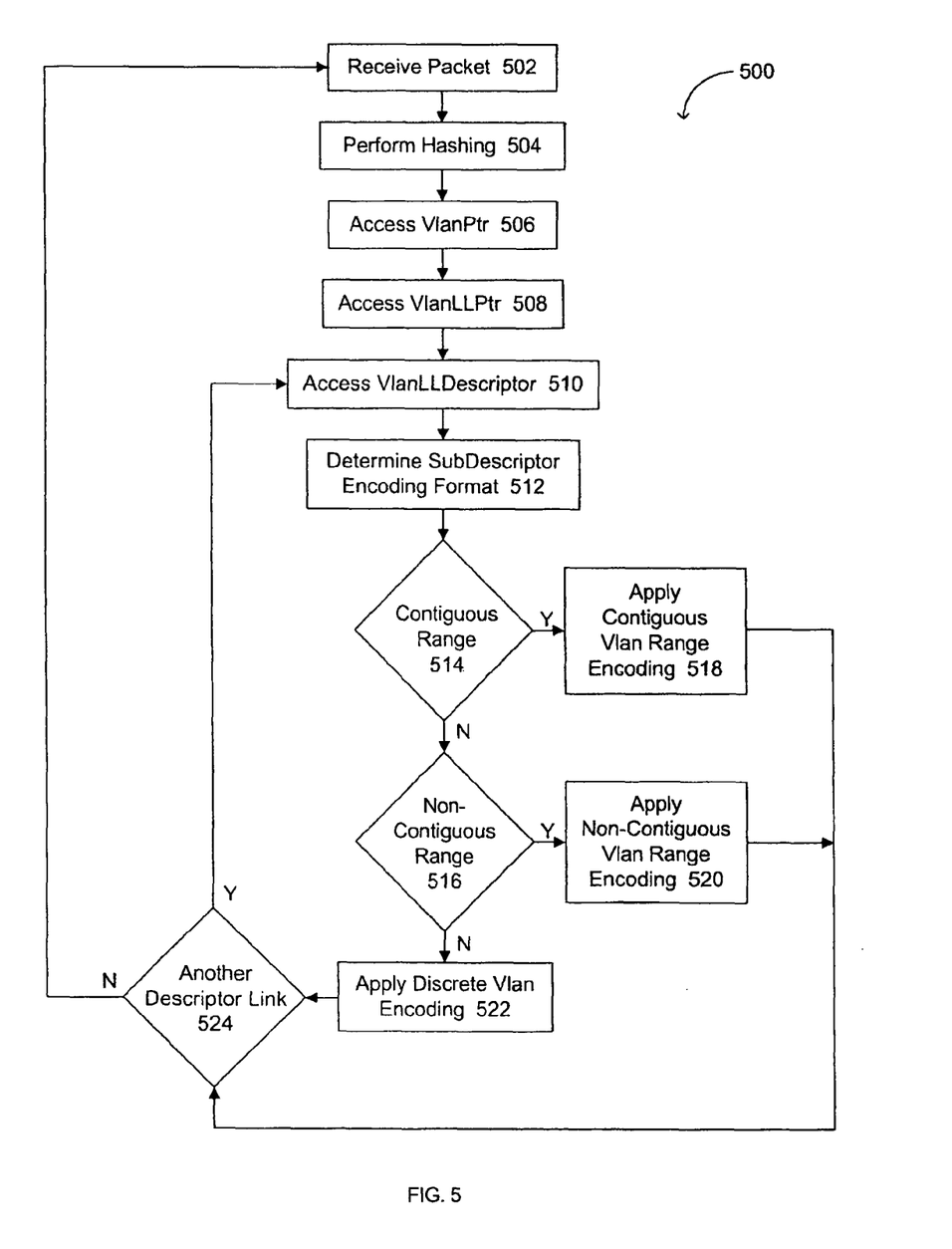
FIG. 5 is a flow diagram of a packet duplication control method suitable for Vlan systems according to an embodiment.

Referring now to FIG. 5, a flow diagram of a packet duplication control method suitable for Vlan systems according to an embodiment is shown and indicated by the general reference character 500. A packet can be received in step Receive Packet 502. A hashing function can be performed in step Perform Hashing 504, but this step may not be necessary depending on the size and type of the available lookup tables. A first pointer can be obtained in step Access VlanPtr 506 and that pointer can designate a second pointer in step Access VlanLLPtr 508. The second pointer, as part of a linked-list structure, can designate a descriptor in step Access VlanLLDescriptor 510. Once a descriptor is found, a format determination for each of its sub-descriptors can begin, for example, with step Determine SubDescriptor Encoding Format 512. Of course, such encoding determination may also be implemented in a more parallel fashion. If decision branch Contiguous Range 514 is true, the flow can proceed to Apply Contiguous Vlan Range Encoding 518 and then to decision branch Another Descriptor Link 524. If decision branch Contiguous Range 514 is false, the flow can proceed to decision branch Non-Contiguous Range 516 which, if true, the flow can proceed to Apply Non-Contiguous Vlan Range Encoding 520 and then to decision branch Another Descriptor Link 524. If decision branch Non-Contiguous Range 516 is false, the flow can proceed to Apply Discrete Vlan Encoding 522 and then to decision branch Another Descriptor Link 524. If decision branch Another Descriptor Link 524 is true, the flow can proceed back to step Access VlanLLDescriptor 510. Otherwise, the flow can proceed back to step Receive Packet 502. In this fashion, duplication of packets can be controlled according to bit encoding interpretations found within linked data structures.

Advantages of the invention include the control of packet duplication over a variety of output ports in a memory efficient and flexible manner.

Having disclosed exemplary embodiments and the best mode, modifications and variations may be made to the disclosed embodiments while remaining within the subject and spirit of the invention as defined by the following claims.

The invention claimed is:

1. A multicast packet duplication system, comprising:
an input port configured to receive a multicast packet including multicast address data;
a pointer table including a plurality of pointers that are selectable based upon the multicast address data, each pointer from among the plurality of pointers including a plurality of entries;
a linked-list table including a plurality of multicast descriptors that are identifiable by a corresponding entry from among the plurality of entries; and
a plurality of output ports configured to output a plurality of duplicates of the multicast packet based upon an identified multicast descriptor from among the plurality of multicast descriptors,
the plurality of duplicates being distributed on a per port basis on at least one of the plurality of the output ports based upon the identified multicast descriptor, rather than by distributing the packet on all of the plurality of output ports;
wherein at least one of the plurality of multicast descriptors is shared among multiple output ports from among the plurality of output ports.

2. The multicast packet duplication system of claim 1, wherein the plurality of multicast descriptors include a multicast packet time to live field.

3. A multicast packet duplication system, comprising:
an input port configured to receive a multicast packet including multicast address data;
a pointer table including a plurality of pointers that are selectable based upon the multicast address data, each pointer from among the plurality of pointers including a plurality of entries;
a linked-list table including one or more multicast Virtual Local Area Network (VLAN) descriptors that are identifiable by a corresponding entry from among the plurality of entries; and
a plurality of output ports, coupled to one or more VLANs, configured to output a plurality of duplicates of the multicast packet to the one or more VLANs based upon an identified VLAN multicast descriptor from among the one or more multicast VLAN descriptors,
the plurality of duplicates being distributed on a per port basis on at least one of the plurality of the output ports based upon the identified VLAN multicast descriptor, rather than by distributing the multicast packet on all of the plurality of output ports;
wherein at least one of the one or more multicast VLAN descriptors is shared among multiple output ports of the plurality of output ports.

4. The multicast packet duplication system of claim 1, wherein some of the plurality of multicast descriptors are configured or programmed for:
duplicating a first Lumber of the plurality of duplicates of the multicast packet on a first output port from among the plurality of output ports; and
duplicating a second number of the plurality of duplicates of the multicast packet on a second output port from among the plurality of output ports, the first number being different from the second number.

5. The multicast packet duplication system of claim 3, wherein some of the one or more multicast VLAN descriptors are configured or programmed for:
duplicating a first number of the plurality of duplicates of the multicast packet on a first output port from among the plurality of output ports; and
duplicating a second number of the plurality of duplicates of the multicast packet on a second output port from among the plurality of output ports, the first number being different from the second number.

6. The multicast packet duplication system of claim 1, further comprising:
a multicast table comprising a plurality of second pointers,
wherein each pointer from among plurality of second pointers is used to select a corresponding pointer from among the plurality of pointers.

7. The multicast packet duplication system of claim 1, wherein the plurality of output ports is coupled to one or more Virtual Local Area Networks (VLANs).

8. The multicast packet duplication system of claim 7, wherein the plurality of entries includes a plurality of second pointers to identify a corresponding multicast descriptor from among the plurality of multicast descriptors.

9. The multicast packet duplication system of claim 7, wherein the plurality of multicast descriptors comprise a plurality of multicast VLAN descriptors.

10. The multicast packet duplication system of claim 9, wherein an encoding format of the plurality of multicast VLAN descriptors comprises at least one of:
a contiguous range encoding that includes a starting VLAN indicator and an ending VLAN indicator for a first set of multicast VLAN descriptors from among the plurality of multicast VLAN descriptors within the contiguous range;
a non-contiguous range encoding that includes information or data of a most significant bit (MSB) portion of a VLAN indicator; and
a discrete encoding that includes a first VLAN indicator and a second VLAN indicator.

11. The multicast packet duplication system of claim 3, wherein the plurality of entries include a corresponding second pointer from among a plurality of second pointers that corresponds to at least one of the one or more multicast VLAN descriptors.

12. The multicast packet duplication system of claim 3, further comprising:
a multicast table comprising a plurality of second pointers,
wherein each pointer from among the plurality of second pointers links to a corresponding pointer from among the plurality of pointers.

13. The multicast packet duplication system of claim 3, wherein an encoding format of the one or more multicast VLAN descriptors includes at least one of:
a contiguous range encoding that includes a starting VLAN indicator and an ending VLAN indicator for a first set of multicast VLAN descriptors or the one or more multicast VLAN descriptors within the contiguous range;
a non-contiguous range encoding that includes information or data of a most significant bit (MSB) portion of a VLAN indicator; and
a discrete encoding that includes a first VLAN indicator and a second VLAN indicator.

14. A multicast packet duplication system, comprising:
an input port configured to receive a multicast packet comprising multicast address data;
a memory including:
- a multicast table including a plurality of first pointers that are selectable based upon the multicast address data, each first pointer from among the plurality of first pointers including a multicast descriptor,
- a multicast Virtual Local Area Network (VLAN) table including a plurality of second pointers that are selectable based upon a corresponding multicast descriptor of a corresponding first pointer from among the plurality of first pointers, each second pointer from among the plurality of second pointers including a plurality of entries, and
- a VLAN linked-list table including a plurality of multicast VLAN descriptors that are identifiable by a corresponding entry from among the plurality of entries of a corresponding second pointer from among the plurality of second pointers; and a plurality of output ports configured to receive a plurality of duplicates of the multicast packet on a per port basis at only those output ports designated in an identified multicast VLAN descriptor from among the plurality of multicast VLAN descriptors.

15. The multicast packet duplication system of claim 14, wherein some of the multicast VLAN descriptors are configured or programmed for:

duplicating a first number of the plurality of duplicates on a first output port from among the plurality of output ports; and duplicating a second number of the plurality of duplicates on a second output port from among the plurality of output ports, the first number being different from the second number.

16. The multicast packet duplication system of claim 14, wherein the plurality of entries include pointers to a corresponding multicast VLAN descriptor from among the plurality of multicast VLAN descriptors.

17. The multicast packet duplication system of claim 14, wherein the multicast descriptor includes a multicast packet time to live field.

18. The multicast packet duplication system of claim 14, wherein each of the plurality of entries describes the multicast packet distribution to a different VLAN.

19. The multicast packet duplication system of claim 14, wherein at least one of the multicast VLAN descriptors is shared among multiple output ports of the plurality of output ports.

20. The multicast packet duplication system of claim 9, wherein the multicast VLAN descriptors include a plurality of entries, each entry from among the plurality of entries describing the multicast packet distribution to a different VLAN.

* * * * *

UNITED STATES PATENT AND TRADEMARK OFFICE
CERTIFICATE OF CORRECTION

| | | |
|---|---|---|
| PATENT NO. | : 8,594,087 B2 | Page 1 of 1 |
| APPLICATION NO. | : 10/687784 | |
| DATED | : November 26, 2013 | |
| INVENTOR(S) | : Singh et al. | |

It is certified that error appears in the above-identified patent and that said Letters Patent is hereby corrected as shown below:

In the Claims

Column 5, Line 65, please replace "a first Lumber" with --a first number--.

Signed and Sealed this
Twenty-seventh Day of May, 2014

Michelle K. Lee
*Deputy Director of the United States Patent and Trademark Office*